United States Patent [19]

Meguro

[11] Patent Number: 4,646,190
[45] Date of Patent: Feb. 24, 1987

[54] MAGNETIC TAPE CASSETTE HAVING AUTOMATIC BRAKE

[75] Inventor: Hiroshi Meguro, Miyagi, Japan

[73] Assignee: Sony Corporation, Tokyo, Japan

[21] Appl. No.: 669,160

[22] Filed: Nov. 7, 1984

[30] Foreign Application Priority Data

Nov. 9, 1983 [JP] Japan .......................... 58-174093[U]
Apr. 6, 1984 [JP] Japan ............................ 59-51080[U]

[51] Int. Cl.$^4$ ........................ G11B 23/04; G11B 15/32
[52] U.S. Cl. .................................... 360/132; 242/198
[58] Field of Search ........................ 360/132, 131, 93; 242/197–200

[56] References Cited

U.S. PATENT DOCUMENTS 3,900,172  8/1975  Kamaya .............................. 242/198

FOREIGN PATENT DOCUMENTS 0045082  7/1981  European Pat. Off. .
0052479  11/1981 European Pat. Off. .
0059946  3/1982  European Pat. Off. .
0066131  5/1982  European Pat. Off. .
0064859  5/1982  European Pat. Off. .
0147172  9/1982  Japan ................................. 360/132

Primary Examiner—Stuart N. Hecker
Assistant Examiner—David J. Severin
Attorney, Agent, or Firm—Lewis H. Eslinger; Alvin Sinderbrand

[57] ABSTRACT

A magnetic tape cassette comprises a hollow casing formed with an access opening therein, tape guide columns, and a pair of reel hubs rotatably mounted within the casing in spaced-apart relation to each other for supporting a magnetic tape wound thereon and defining a tape run adjacent to the opening. A lid is mounted pivotally on the casing between a closed position wherein it covers the opening, thereby affording protection to the tape, and an open position wherein it uncovers the opening, thereby exposing the tape for cooperation with recording-reproducing apparatus. A brake member is mounted within the casing movably between a braking position wherein it locks the hubs against rotation and a releasing position wherein it releases the hubs for rotation. The lid is engageable with the brake member and in pivoting from the closed position to the open position effects movement of the brake member from the braking position to the releasing position and in moving from the open position to the closed position effects movement of the brake member from the releasing position to the braking position.

6 Claims, 15 Drawing Figures

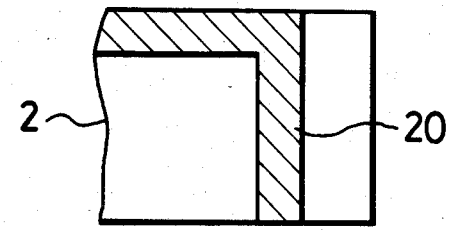
FIG. 15
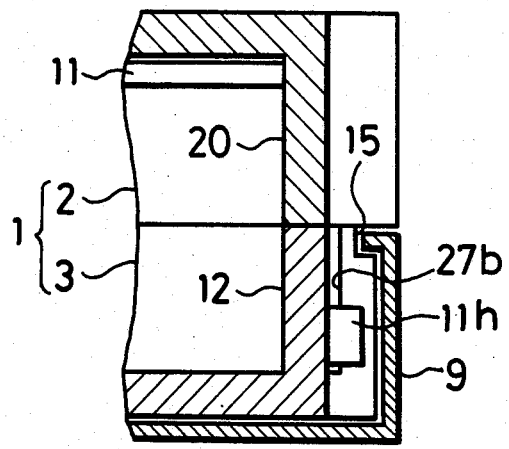
FIG. 14
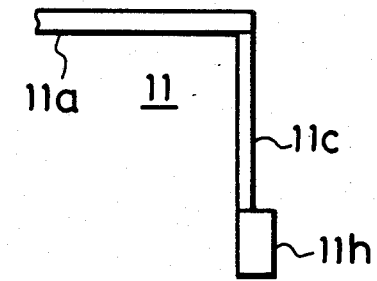
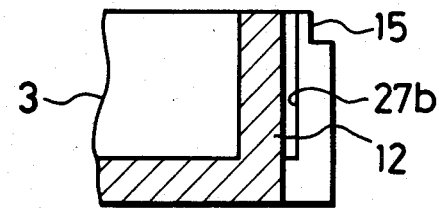

MAGNETIC TAPE CASSETTE HAVING AUTOMATIC BRAKE

BACKGROUND OF THE INVENTION

1. Field of the Invention

This invention relates to magnetic tape cassettes and, more particularly, to a novel and highly-effective magnetic tape cassette suitable for use for recording a digital signal, for example a PCM (pulse code modulated) signal.

2. Description of the Prior Art

Recording and reproducing apparatus is known in which an analog signal such as an audio signal or the like is converted into a digital signal, for example a PCM signal, and then recorded on (or reproduced from) a magnetic tape. The known PCM recording and reproducing apparatus includes apparatus in which a rotary head is employed to achieve a relatively high recording density. In such PCM recording and reproducing apparatus, a magnetic tape is first drawn out from the tape cassette and wound around a rotary drum in which a rotary head is provided, and then the recording or reproducing is carried out.

If oil from fingerprints or the like or dust from the atmosphere adheres to the magnetic tape, a dropout is caused in the reproduced signal. In order to prevent oil and dust, etc., from adhering to the magnetic tape, the tape must be enclosed as tightly as possible in a protective cassette. However, it is necessary to provide an access opening near the front of the tape cassette through which a portion of a tape guide system is inserted into the tape cassette in order to draw the magnetic tape out of the tape cassette for recording or reproducing.

To accommodate this need, a conventional tape cassette may be provided with a rotatable front lid which covers or uncovers a front opening into the cassette in accordance with the rotation of the lid.

FIGS. 1 and 2 show a cassette casing 1 which is typical of the prior art and comprises an upper section 2 and a lower section 3 which are connected by screw bolts (not shown) to form an integral structure. A transparent window plate 2a is provided on the upper surface of the upper section 2.

A pair of reel hubs 4a and 4b are incorporated into the cassette casing 1 and rotatably engaged in a pair of reel shaft insertion apertures 5a and 5b. The apertures 5a and 5b are formed in the lower section 3 at predetermined positions which establish a suitable spacing between the reel hubs 4a and 4b. A magnetic tape 6 is wound around the reel hubs 4a and 4b.

A front lid 8 is rotatably or pivotally mounted on the right and left side walls of the cassette casing 1 near the front of the tape cassette. When the front lid 8 is rotated away from the front surface of the tape cassette, the magnetic tape 6 is exposed at the front of the tape cassette. A cutout portion 3a of rectangular shape is formed in the bottom surface of the lower section 3 near the front of the tape cassette. During use, a tape guide system (not shown) is inserted into the cutout portion 3a in order to draw out the magnetic tape 6 from the front of the cassette casing 1. A slider 9 is engaged with the lower section 3 for opening and closing the cutout portion 3a.

In such a tape cassette, during use, as shown in FIG. 2, the front lid 8 is rotated away from the front surface of the tape cassette to expose the magnetic tape 6, the slider 9 is moved to the rear, and the tape guide system is inserted into the cutout portion 3a to draw out from the cassette casing 1 the magnetic tape 6 which is then loaded on the rotary drum so as to effect a predetermined recording or playback. Thereafter, when the recording or playback is ended and the tape cassette is returned to a non-use or standby mode, an operation opposite to the one described above is carried out.

In the conventional tape cassette described above, the magnetic tape 6 is apt to become slack. In such a case, when the front lid 8 of the tape cassette is rotated upwards as shown in FIG. 2, the edge thereof may engage the magnetic tape 6 so that the tape 6 is damaged or entangled thereby and drawn out from the cassette casing 1. Such a premature drawing out precludes establishment of the proper positional relation between the tape guide system and the magnetic tape 6. There is then a risk that it may become impossible for the tape guide system to engage the magnetic tape 6 properly and load it on the rotary drum. Moreover, when the front lid 8 is rotatably moved from the position of FIG. 2 to the position of FIG. 1, so that it closes the front opening of the tape cassette, the magnetic tape 6, if slack, may be pinched between the front lid 8 and the cassette casing 1 so that the tape 6 becomes crumpled and scarred.

In an earlier attempt to solve this problem, a tape cassette was proposed incorporating within the casing 1 a brake mechanism which prevents the reel hubs 4a and 4b from being rotated. This brake mechanism can be operated from the outside of the casing 1 by a knob or lever to prevent the tape 6 from becoming slack or to permit withdrawal of the tape 6, as may be required. However, in this previously proposed cassette, in addition to the operation of rotating the front lid 8, a separate operation for controlling the brake mechanism is required, which complicates the operation of the recording-reproducing apparatus, either because a human operator must take additional precautions or because the mechanical structure must be made more complex. Moreover, the knob or lever used to operate the brake mechanism is inevitably exposed outside the casing 1, which detracts from the appearance of the tape cassette.

OBJECTS AND SUMMARY OF THE INVENTION

An object of the invention is to provide an improved magnetic tape cassette.

Another object of the invention is to provide a magnetic tape cassette having a lid which is pivotable between open and closed positions and incorporating features that prevent the lid from prematurely drawing out the tape in pivoting from the closed position to the open position and prevent the lid from pinching or otherwise damaging the tape in pivoting from the open position to the closed position.

Other objects of the invention include, but are not limited to, the following:

to provide a magnetic tape casette which can be assembled with ease and is therefore inexpensive to manufacture;

to provide a magnetic tape cassette suitable for recording and reproducing a digital signal, for example a PCM (pulse code modulated) signal; and to provide a magnetic tape cassette which attains the preceding objects while having an attractive appearance.

According to one aspect of the invention, a magnetic tape cassette is provided comprising a hollow casing formed with an access opening therein; tape transport means including a pair of reel hubs rotatably mounted within the casing in spaced-apart relation to each other for supporting a magnetic tape wound thereon, the tape transport means defining a tape run adjacent to the opening; lid means; mounting means mounting the lid means movably on the casing between a closed position wherein it covers the opening, thereby affording protection to the tape, and an open position wherein it uncovers the opening, thereby exposing the tape for cooperation with recording-reproducing apparatus; and brake means mounted within the casing movably between a braking position wherein it locks the hubs against rotation and a releasing position wherein it releases the hubs for rotation; the lid means being engageable with the brake means and in moving from the closed position to the open position effecting linear movement of the brake means from the braking position to the releasing position and in moving from the open position to the closed position effecting linear movement of the brake means from the releasing position to the braking position.

The other objects, features and advantages of the present invention will become apparent from the following description taken in conjunction with the accompanying drawings, in which like references designate the same elements and parts.

BRIEF DESCRIPTIONS OF THE DRAWINGS

FIG. 14 is an enlarged cross-sectional view of a portion of the tape cassette shown in FIG. 12 looking in the front-to-back direction; and FIG. 15 is an enlarged schematic diagram of a portion of the tape cassette of FIG. 12 illustrating certain features that facilitate assembly thereof.

DESCRIPTION OF THE PREFERRED EMBODIMENTS

Figure 1:
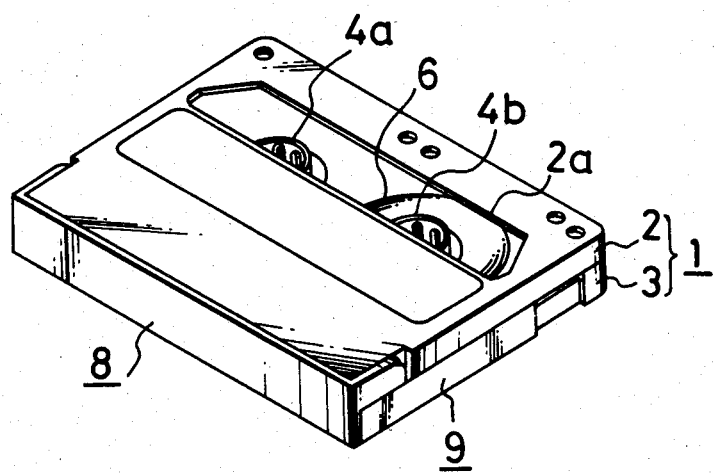
FIG. 1 is a perspective view from above of a typical prior-art tape cassette having a rotatable front lid and a slider, the cassette being shown in a standby or non-use mode wherein the lid is closed and the slider is moved forward.
Figure 2:
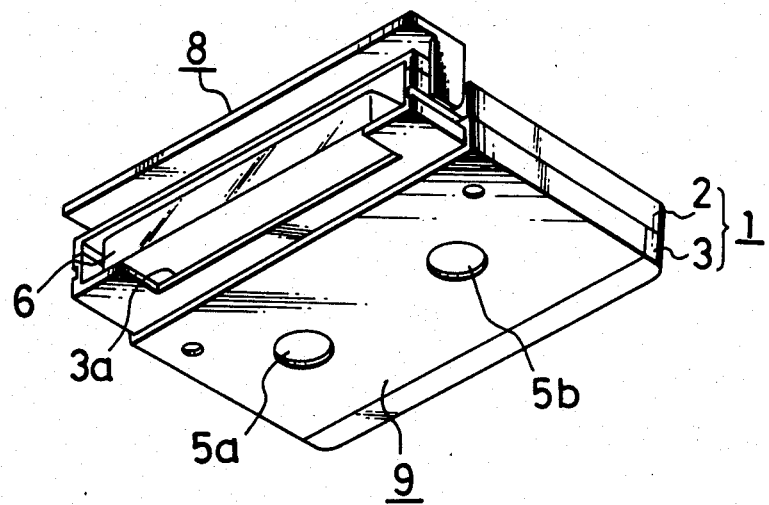
FIG. 2 is a perspective view from below of the tape cassette of FIG. 1, the cassette being shown in a service or use mode wherein the front lid thereof is rotated in the upper direction to the open position and the slider is slid backward.
Figure 3:
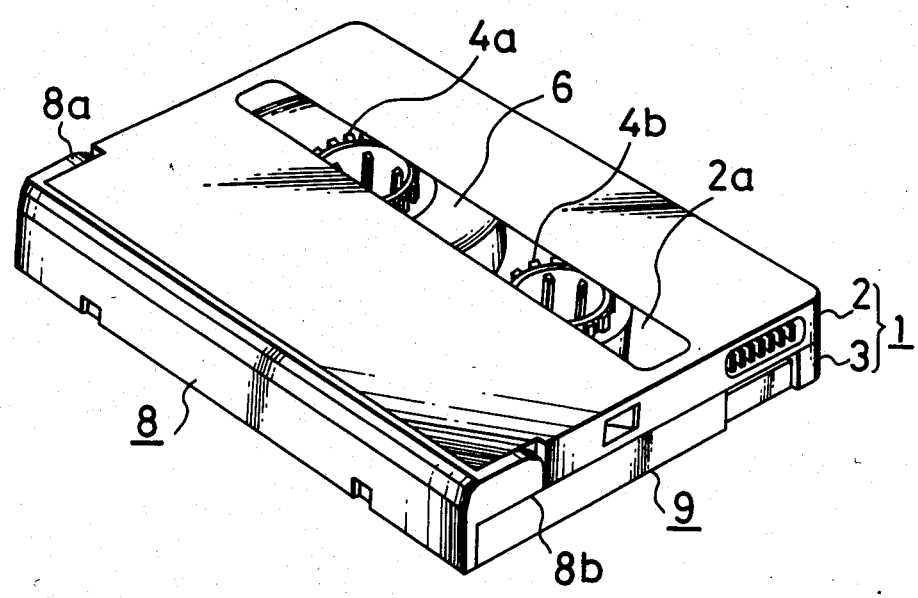
FIG. 3 is a perspective view from above of a first embodiment of a magnetic tape cassette according to the present invention, the cassette being shown in a standby or non-use mode.

FIGS. 3-11 show a first preferred embodiment of a magnetic tape cassette constructed according to the invention. In FIGS. 3-11, parts corresponding to those in FIGS. 1 and 2 are marked with the same references and are not described in detail.

As in the case of prior-art cassette casing, the cassette casing 1 of the invention comprises an upper section 2 and a lower section 3 which are connected by screw bolts (not shown) to form an integral structure. A transparent window plate 2a is formed on the upper surface of the upper section 2.

Tape transport means including a pair of reel hubs 4a and 4b is incorporated in the cassette casing 1. The hubs 4a and 4b are rotatably mounted within the casing in spaced-apart relation to each other and engaged in a pair of reel shaft insertion apertures 5a and 5b. The apertures 5a and 5b are formed in the lower section 3 at predetermined positions which establish a suitable spacing between the reel hubs 4a and 4b. The magnetic tape 6 is wound around the reel hubs 4a and 4b.

Figure 5:
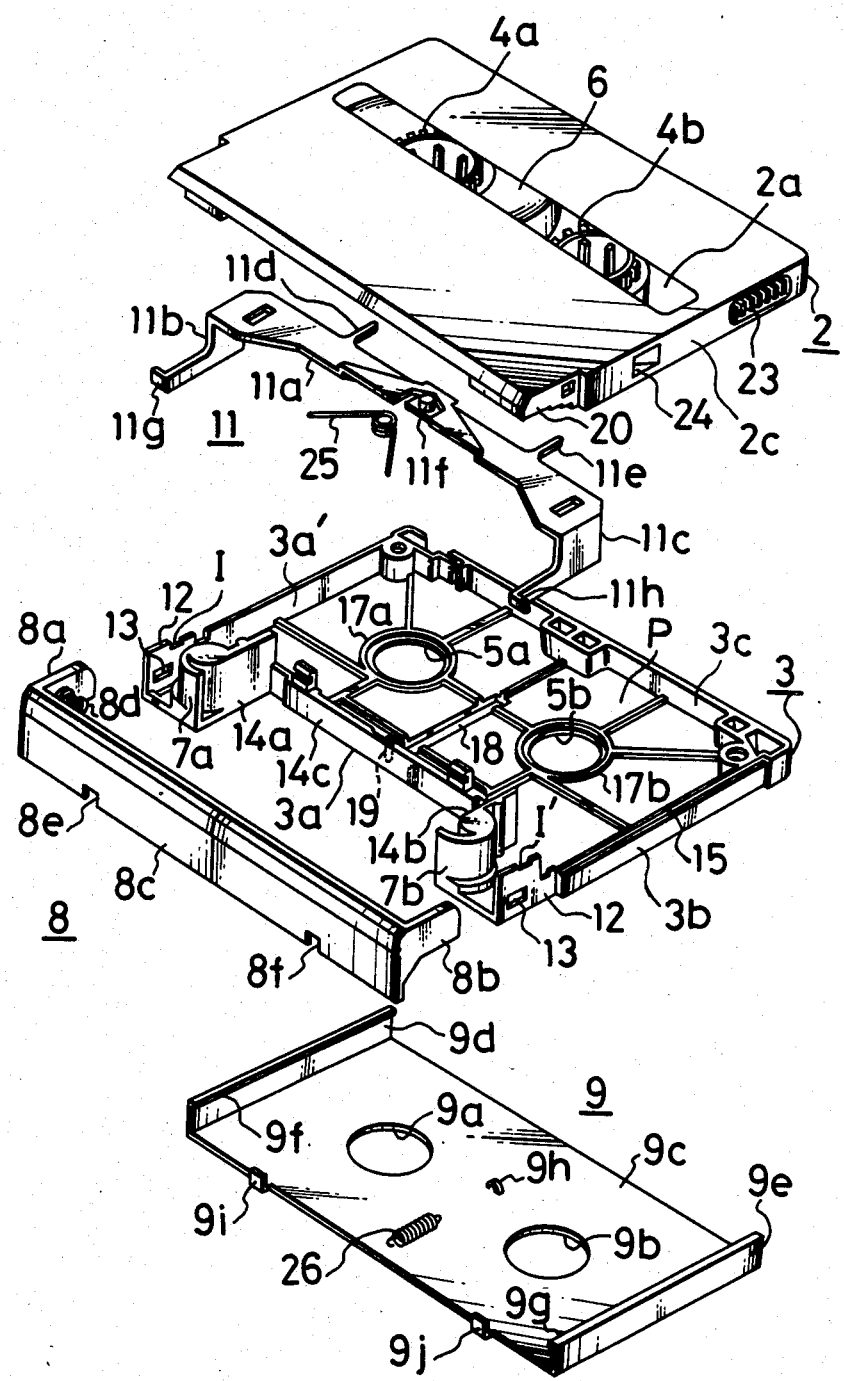
FIG. 5 is an exploded perspective view from above of the tape cassette of FIG. 3.
Figure 6:
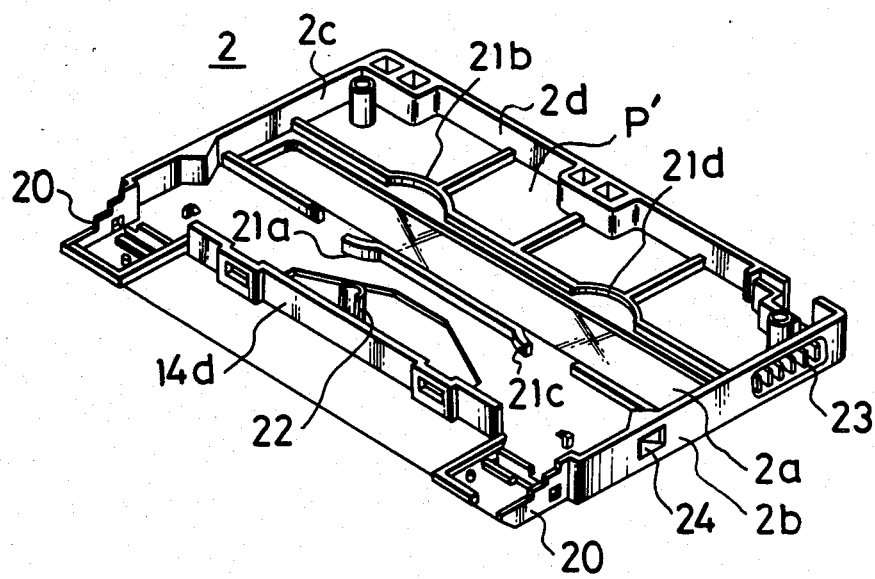
FIG. 6 is a perspective view from above of the upper section of the tape cassette of FIG. 3, the upper section being shown upside down so that the inside thereof is visible.
Figure 11:
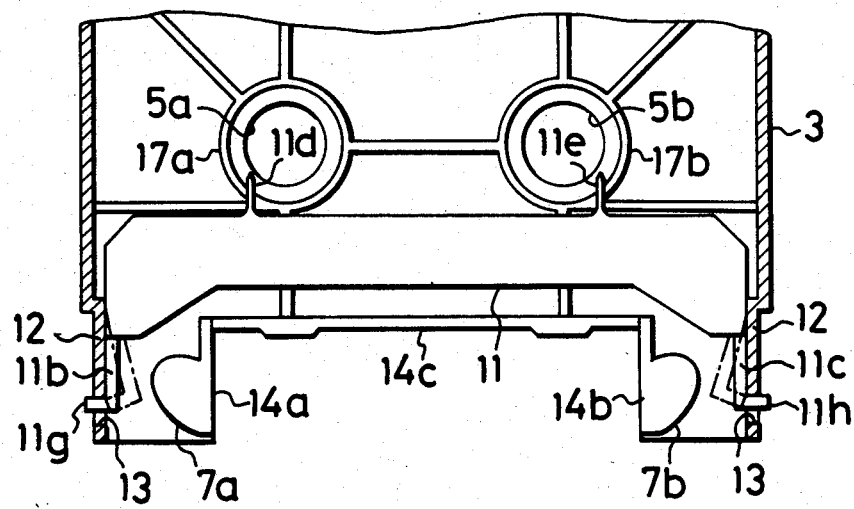
FIG. 11 is a plan view of a portion of the tape cassette of FIG. 3 illustrating certain features that facilitate assembly thereof.
Figure 7:
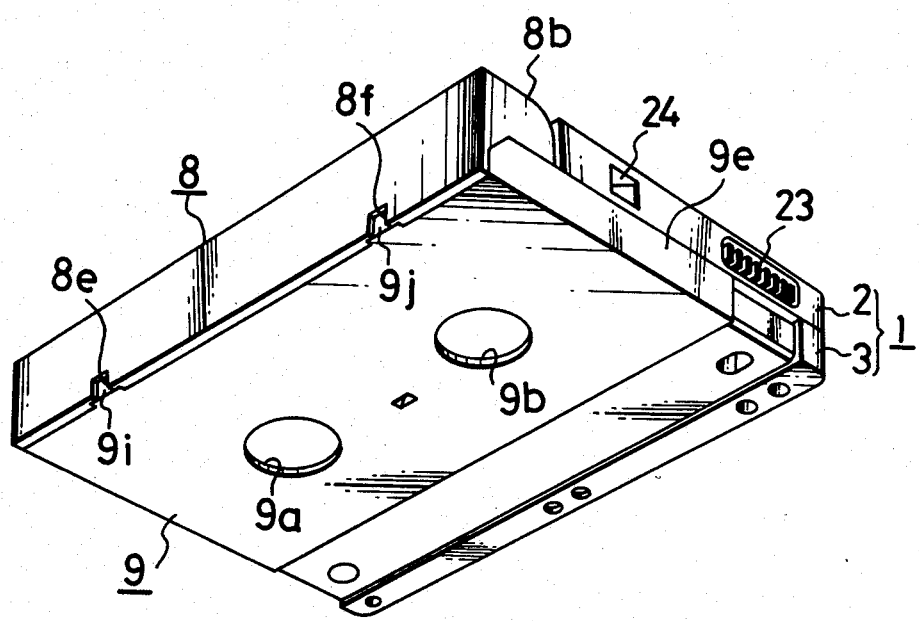
FIG. 7 is a perspective view from below of the tape cassette of FIG. 3 in its standby or non-use mode.
Figure 8:
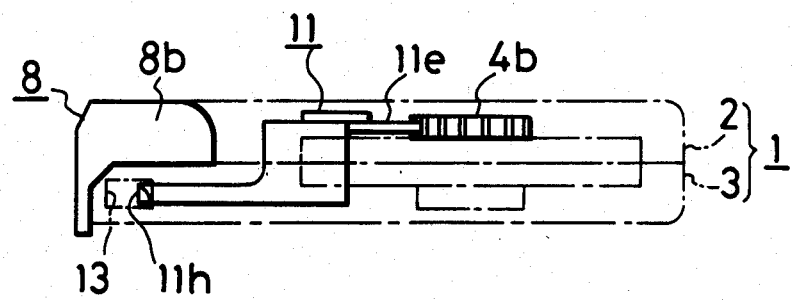
FIG. 8 is a schematic diagram in side elevation illustrating certain relationships characteristic of the standby mode of the tape cassette of FIG. 3.

The tape transport means also includes tape guide columns 7a and 7b which are mounted on the lower section 3 adjacent to the front thereof near the left and right side walls 3a', 3b of the lower section 3 (FIG. 5) and 2b, 2c of the upper section 2 (FIGS. 5 and 6). The magnetic tape 6 is stretched between and in contact with the tape guide columns 7a and 7b so as to be transported along a predetermined tape run or path adjacent to the front of the tape cassette.

A rectangular cutout 3a is also formed in the lower section 3 over a predetermined width so that it exposes the rear surface of the magnetic tape 6 stretched between the tape guide columns 7a and 7b. Upon recording or reproducing, a device constituting part of a tape handling system is inserted into the cutout portion 3a in order to draw out the magnetic tape 6. The tape handling system is provided in the recording and reproducing apparatus (not shown).

Figure 4:
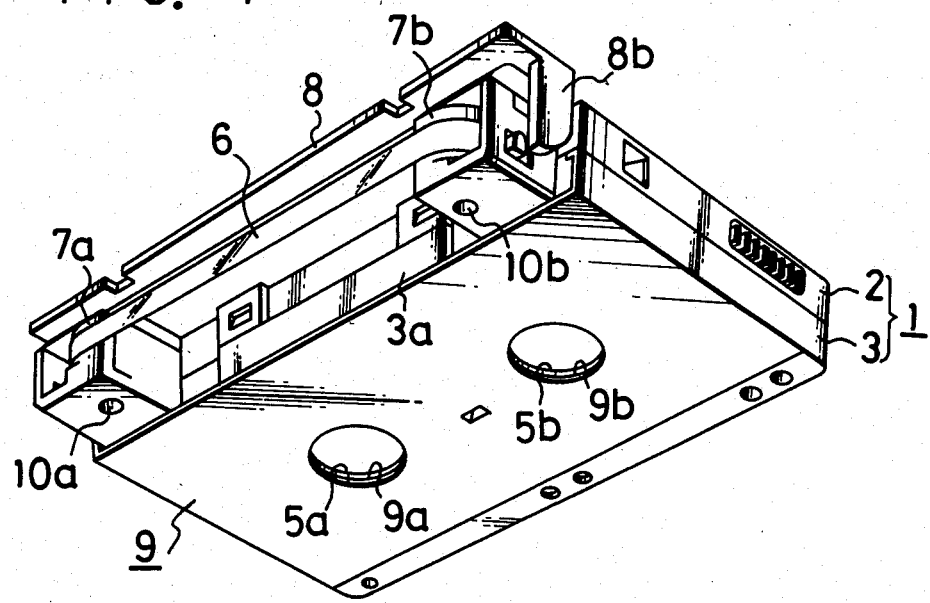
FIG. 4 is a perspective view from below of the tape cassette of FIG. 1, the cassette being shown in a service or use mode.
Figure 9:
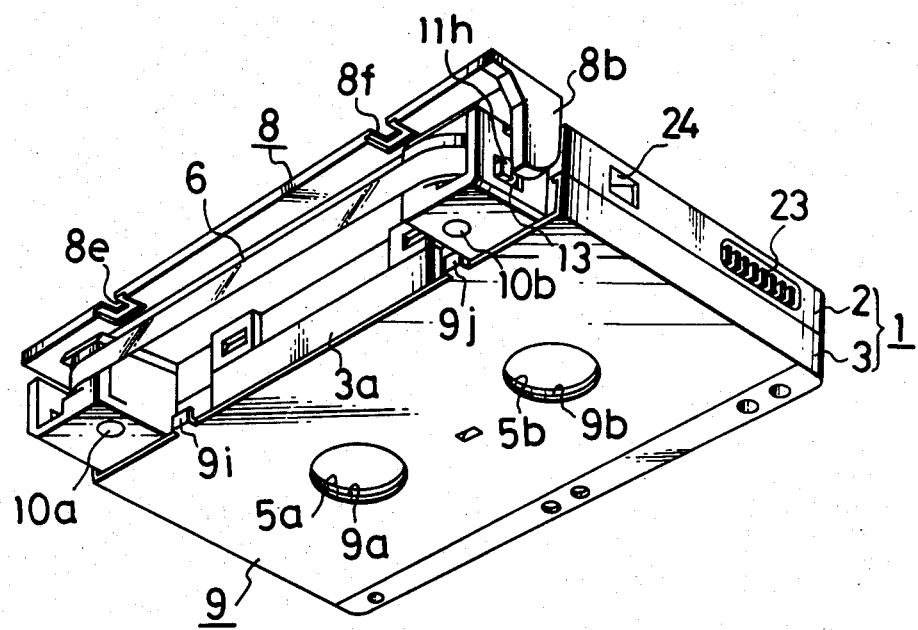
FIG. 9 is a perspective view from below of the tape cassette of FIG. 3 in the use mode, FIG. 9 being thus similar to FIG. 4 but serving to emphasize additional features of the tape cassette.
Figure 10:
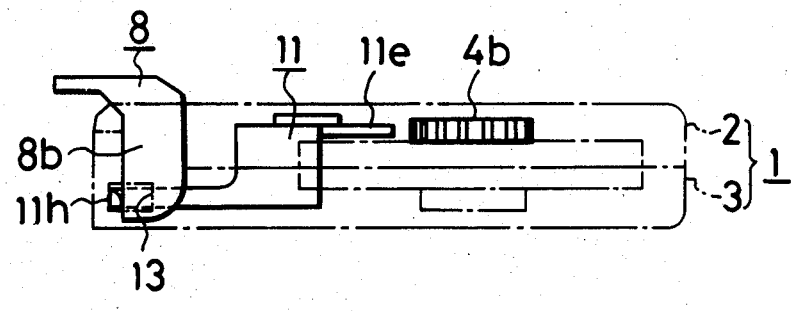
FIG. 10 is a schematic diagram in side elevation illustrating certain relationships characteristic of the use mode of the tape cassette of FIG. 3.

The front lid 8 is elongated in the direction of elongation of the front opening into the cassette 1 and formed adjacent to opposite ends thereof with arms 8a and 8b which are rotatably (pivotally) mounted on the front of the cassette casing 1. The front lid 8 is adapted to selectively open and close the front of the cassette casing 1. A slider or sliding member 9 of substantially U shape is mounted so that it can be slidably moved back and forth in opposing relation to the lower surface and left and right side walls 3a', 3b of the lower cassette section 3. Apertures 9a and 9b respectively corresponding to the reel shaft insertion apertures 5a and 5b are formed in the slider 9 at positions such that, when the sliding member 9 is slidably moved backward to expose the cutout portion 3a, the apertures 9a and 9b are respectively aligned with the reel shaft insertion apertures 5a and 5b (FIGS. 4 and 9). Positioning holes 10a and 10b are formed in the lower surface of the lower cassette section 3 in correspondence (alignment) with the tape guide columns 7a and 7b.

FIG. 5 shows the relative positions of the front lid 8, the sliding member 9, a reel brake member 11, which is described below, the upper section 2 and the lower section 3. Each of these components may be made of a synthetic resin, for example ABS resin.

As FIG. 5 shows, the lower cassette section 3 comprises a flat plate P of substantially rectangular shape in which the reel shaft insertion apertures 5a and 5b are formed and a frame including left and right side walls 3a' and 3b, a front portion at which the front lid 8 is disposed, and a rear wall 3c. The left and right side walls 3a, 3b and the lower surface of the lower section 3 (except the portions thereof lying within the slidable range of the slider 9) are formed with an extra thickness equal to the thickness of the slider 9. That is, the left and right side walls 3a', 3b and the lower surface of the lower section 3 corresponding to the slidable range of the sliding member 9 are stepped inwardly so that, when the slider 9 engages the lower section 3, the outer surface of so much of the lower section 3 as lies beyond the range of movement of the slider 9 and the outer surface of the slider 9 lie in the same planes.

The left and right side walls 3a', 3b near the front are stepped inwardly to form support walls 12, 12 and thereby define steps corresponding to the thickness of the arms 8a, 8b of the front lid 8. The tops of the support walls 12, 12 are formed with indentations I, I'. When the upper section 2 and lower section 3 are assembled together, support walls 20, 20 on the upper section 2 abut support walls 12, 12 on the lower section 3 in edge-to-edge relation. The indentations I, I' then form apertures to facilitate pivotal mounting of rotary shafts 8d (only one of which is visible in FIG. 5) of the front lid 8. Rectangular insertion apertures 13, 13 are formed through the support walls 12, 12 at positions such that, when the front lid 8 is rotated upwards, as in FIGS. 4, 9, and 10, the lower portions of the arms 8a, 8b engage tabs 11g, 11h of the brake member 11 and release a brake which otherwise prevents the reel hubs 4a, 4b from rotating (compare FIGS. 8 and 10). Shields 14a, 14b and 14c are respectively formed at the left and right sides and rear of the cutout portion 3a, whereby the inside of the cassette casing 1 is shielded from the cutout portion 3a.

Lateral groves 15, 15 (only one of which is visible in FIG. 5) each parallel to the front-to-back direction are formed on the upper edge of the left and right side walls 3a', 3b of the lower section 3. The depths of the lateral groves 15, 15 are less than the thickness of the arms 8a, 8b of the front lid 8.

Collar or flange portions 17a, 17b of annular shape are respectively formed around the pair of reel shaft insertion apertures 5a, 5b.

In order to provide for biasing the slider 9 to the forward position, a spring-accommodating slot 18 of rectangular shape is formed in the plate P at an intermediate position between the reel shaft insertion apertures 5a, 5b and extends with its major dimension parallel to the front-to-rear direction. A spring-engaging column member 19 is mounted near the front of the spring-accommodating slot 18. One end of a coil tension spring 26 for biasing the slider 9 forwardly is attached to the member 19; the other end of the spring 26 is attached to an anchor 9h on the slider 9.

FIGS. 5 and 6 show details of the upper section 2. The section 2 comprises a flat plate P' of substantially rectangular shape in which the transparent window plate 2a is formed and a frame including left and right side walls 2b, 2c and a rear wall 2d. The outer dimension of the upper section 2 is substantially the same as the outer dimension of the lower section 3 when the latter is assembled with the slider 9. Accordingly, when the cassette is assembled, there is no step between the upper section 2 and the lower section 3.

Support walls 20, 20 are formed so that the portions of the left and right side walls 2b and 2c near the front are respectively stepped inwardly by the thicknesses of the arms 8a, 8b of the front lid 8 in correspondence with the support walls 12 of the lower section 3. The shapes of the support walls 20, 20 and 12, 12 where they face each other define apertures as described above but are complementary to the extent that they are able to meet in edge-to-edge relation.

A shielding wall 14d (FIG. 6) is formed in correspondence with the shielding wall 14c (FIG. 5). When the upper section 2 and lower section 3 are coupled together, the shielding walls 14d and 14c abut each other, thereby shielding the inside of the cassette casing from the cutout portion 3a.

Collar or flange portions 21a, 21b, 21c and 21d of arcuate shape are formed so as to correspond to the annular collars 17a, 17b formed on the lower section 3. The reel hubs 4a and 4b are respectively rotatably supported by the collar portions 21a, 21b, and 21c, 21d of the upper section 2 and the annular collars 17a, 17b of the lower section 3. The heights of the collar portions 21a, 21b, 21c and 21d are substantially the same as the thickness of the portions of the reel brake member 11 which lie along the upper section 2, so that the reel brake member 11 does not protrude beyond the collar portions 21a, 21b, 21c and 21d. This prevents the reel brake member 11 from damaging the magnetic tape 6.

A fixing boss 22 (FIG. 6) of U shape in cross section is formed on the upper section 2 in correspondence with the spring-engaging column member 19 formed on the lower section 3. When the upper section 2 and lower section 3 are coupled together, the spring-engaging column member 19 is located within the opening of the fixing boss 22, and hence the end of the coil spring 26 engaged with the spring-engaging column member 19 is retained thereon by the end of the fixing boss 22.

Portions 23 which are alternately concave and convex are formed on the right and left side walls 2b, 2c near the rear to facilitate a secure grip when the cassette is held in the hand. Concave supports 24, 24 of substantially V shape are formed substantially at the central portions of the left and right side walls 2b, 2c. When the tape cassette is loaded in the recording and reproducing apparatus, the concave supports 24, 24 are engaged by support studs (not shown) from both right and left directions.

As FIG. 5 shows, the reel brake member 11 comprises a slide guide plate 11a which is elongated in a direction parallel to the front opening of the casing and to the lid 8 and lies along the inner surface of the upper section 2. The member 11 also comprises arms 11b, 11c of L shape which respectively extend down perpendicularly from both end portions of the slide guide plate 11a and then forward. Brake pins 11d and 11e corresponding to the pair of reel hubs 4a, 4b are formed at the rear of the slide guide plate 11a. Brake wheels are formed on the outer peripheral portions of the reel hubs 4a, 4b in correspondence with the brake pins 11d and 11e.

A spring-engaging stud 11f is provided at the central portion of the slide guide plate 11a, and operating tabs 11g, 11h are respectively formed on the ends of the arms 11b and 11c. The middle of a spring 25 which is used to bias the reel brake member 11 toward the braking position engages the spring-engaging stud 11f. The free ends of the spring 25 press against the rear of the shield wall 14d (FIG. 6) of the upper section 2 so that the brake pins 11d, 11e normally engage the brake wheels formed on the outer peripheral portions of the reel hubs 4a, 4b (see FIG. 8), whereby the reel hubs 4a, 4b are locked so as not be rotated.

When the reel brake member 11 is disposed within the cassette 1, the end portions of the tabs 11g, 11h protrude through the insertion apertures 13, 13 of the lower section 3 to the outsides of the support walls 12 by a predetermined amount. When the front lid 8 is rotated upwards, the tabs 11g, 11h thus protruding are engaged by the end portions of the arms 8a, 8b of the front lid 8, and the reel brake member 11 is slid forward against the biasing force of the spring 25. The brake pins 11d, 11e are thus disengaged from the brake wheels of the reel hubs 4a, 4b, and then the pair of reel hubs 4a, 4b can be rotated (see FIG. 10).

As FIG. 5 shows, the front lid 8 comprises a plate 8c which is elongated in the direction of the opening into the cassette casing 1 and closes the front of the cassette casing 1. The lid 8 also comprises opposed arms 8a, 8b respectively provided at opposite ends of the plate 8c so as to form a substantially U-shaped structure as viewed from above. When the front lid 8 is rotated to close the front of the cassette casing 1, the arms 8a, 8b cover the right and left support walls 20 of the upper section 2. When the front lid 8 is in this rotation position, the spring 26 can move the sliding member 9 forward under the arms 8a, 8b to the position shown in FIGS. 3 and 7. The rotary shafts 8d (only one of which is visible in FIG. 5) about which the lid 8 pivots are provided substantially at the centers of the inner surfaces of the respective arms 8a, 8b. Cut-away portions 8e, 8f are formed by cutting away the plate 8c adjacent to the left and right sides of the cutout portion 3a of the lower section 3.

The sliding member 9 as shown in FIG. 5 comprises a flat plate 9c which lies along the lower surface of the lower section 3 and side plates 9d, 9e which are respectively located at the left and right sides of the flat plate 9c and lie along the outer surfaces of the left and right side walls 3a' and 3b of the lower section 3. The sliding member 9 is thus substantially U-shaped as seen in the front-to-back direction. Flanges 9f and 9g are provided by bending the upper ends of the side plates 9d, 9e inwardly. The flanges 9f, 9g are located within the lateral groves 15 of the lower section 3 when the sliding member 9 is assembled with the cassette casing 1. As noted above, the spring-engaging anchor or member 9h is formed on the flat plate 9c in correspondence with the spring-accommodating slot 18 of the lower section 3, and the tension coil spring 26 is adapted to bias the sliding member 9 in the forward direction. One end of the tension coil spring 26 engages the spring-engaging column member 19 of the lower section 3 and the other end thereof engages the spring-engaging member 9h, with the result that the sliding member 19 is biased forward to close the cutout portion 3a. This movement of the sliding member 9 also moves the apertures 9a, 9b out of register with the apertures 5a, 5b so as to provide a complete enclosure of the tape 6.

Contact pieces 9i and 9j extend upwards perpendicularly from the flat plate 9c at the front of the plate at positions which correspond to the cut-away portions 8e and 8f of the front lid 8. The contact pieces 9i and 9j enable recording-reproducing apparatus to slide the member 9 to the rear in preparation for opening the cassette 1 in a manner described below.

FIGS. 7-10 show the operation of the tape cassette 1. When the cassette 1 is not in use (see FIGS. 7 and 8), the front thereof is closed by the front lid 8 and the sliding member 9 is biased by the coil spring 26 to a forward position. At that time, the reel brake member 11 is biased in the rearward direction by the spring 25 and hence the brake pins 11d, 11e engage the brake wheels of the reel hubs 4a, 4b so that the reel hubs 4a, 4b are locked and cannot rotate. Further, the reel shaft insertion apertures 5a, 5b of the cassette casing 1 and the corresponding apertures 9a, 9b formed through the sliding member 9 are displaced from each other and the cutout portion 3a is closed by the sliding member 9. The magnetic tape 6 is thus fully enclosed, dust being prevented from entering through the apertures 5a, 5b and the cutout portion 3a and adhering to the magnetic tape 6, and fingers and the like being prevented from touching the magnetic tape 6. Furthermore, the side plates 9d, 9e of the slider 9 are located beneath the arms 8a, 8b, and the upper edges of the side plates 9d, 9e abut the lower edges of the arms 8a, 8b, whereby the front lid 8 is locked so as not to rotate. As a result, when the cassette is not in use, the front lid 8 is prevented from being opened unintentionally.

In use, the tape cassette is loaded on the recording and reproducing apparatus, and studs (not shown) provided in the recording and reproducing apparatus engage the contact members 9i and 9j of the sliding member 9 through the cut-away portions 8e and 8f of the front lid 8. Then, when the tape cassette is further inserted to a predetermined position in the recording and reproducing apparatus, the sliding member 9 is held stationary by the studs of the recording and reproducing apparatus, while the cassette casing 1 is moved against the biasing force of the coil spring 26.

This slides the sliding member 9 backwards relative to the cassette casing 2, thus opening the cutout portion 3a, exposing the positioning apertures 10 and 10b (FIG. 9), and aligning the apertures 9a, 9b of the sliding member 9 with the reel shaft insertion apertures 5a, 5b so that the reel shaft insertion apertures 5a, 5b are opened. The front lid 8 is then rotated upwards by a lid rotating member (not shown) of the recording and reproducing apparatus and brought to the condition shown in FIGS. 9 and 10. As the front lid 8 is thus rotated, the operating tabs 11g, 11h of the reel brake member 11 are pressed forward by the lower ends of the arms 8a, 8b, thereby to slide the reel brake member 11 forward against the biasing force of the spring 25. This disengages the brake pins 11d, 11e from the brake wheels of the reel hubs 4a, 4b and releases the reel hubs 4a, 4b so that they can rotate.

Positioning protrusions (not shown) and reel shafts (not shown) of the recording and reproducing apparatus are respectively inserted into the positioning apertures 10a, 10b and the reel shaft insertion apertures 5a, 5b, the magnetic tape 6 is exposed at the front of the cassette casing 1, and the tape guide system (not shown) is inserted into the cut-out portion 3a. The guide system draws out the magnetic tape and loads it on the rotary drum of the recording and reproducing apparatus, and then the predetermined recording or playback is carried out.

When the magnetic tape cassette is taken out of service and returned to a standby condition, a procedure opposite to that described above is carried out.

FIGS. 12–15 show another embodiment of a magnetic tape cassette according to the present invention. In FIGS. 12–15, parts corresponding to those in FIGS. 3–11 are marked with the same references; accordingly, they are not described in detail.

Figure 12:
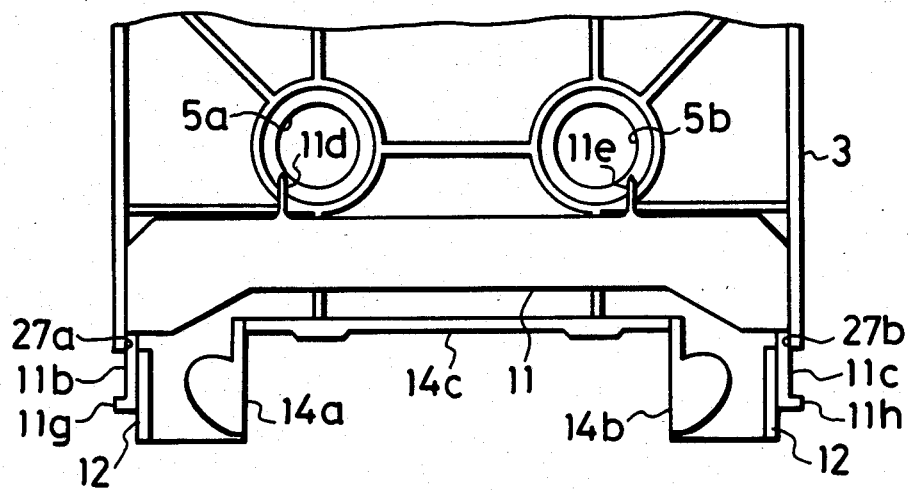
FIG. 12 is a view similar to FIG. 11 but showing another embodiment of a magnetic tape cassette according to the invention.
Figure 13:
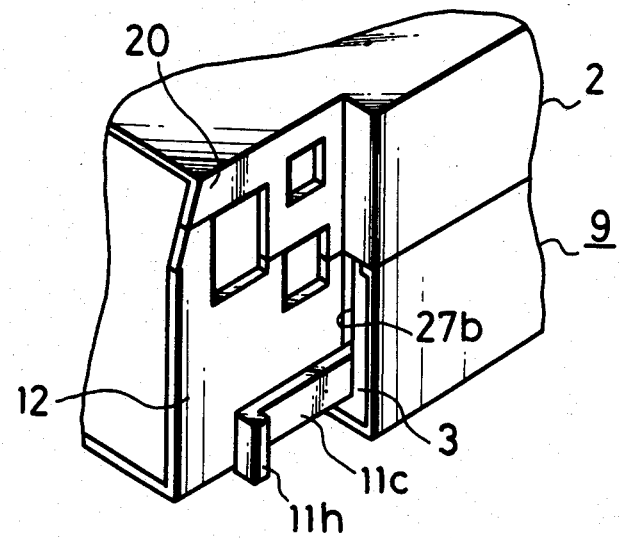
FIG. 13 is an enlarged perspective view of a portion of the tape cassette of FIG. 12.

As FIGS. 12–14 show, operating member insertion grooves 27a, 27b are respectively formed on the borders between the left and right support walls 12, 12 of the lower section 3 and the left and right side walls thereof. The left and right support walls 12, 12 are respectively displaced inwardly from the left and right side walls in the side-to-side direction of the cassette casing 1 by an amount corresponding to the sum of the thicknesses of the arms 8a, 8b and the arms 11b, 11c. Also, the widths of the operating member insertion grooves 27a, 27b in the side-to-side direction of the cassette casing 1 are made a little larger than the thicknesses of the arms 11b, 11c. As a result, the arms 11b, 11c of the reel brake member 11 can be moved within the operating member insertion grooves 27a, 27b.

As FIGS. 13 and 14 show, in the upper section 2, support walls 20, 20 are formed at positions corresponding to the support walls 12, 12 of the lower section 3, so that when the upper section 2 and the lower section 3 are coupled together, the support walls 20, 20 of the upper section 2 and the support walls 12, 12 of the lower section 3 abut one another in a complementary relation, and the upper ends of the operating member insertion grooves 27a, 27b of the lower section 3 are closed by the upper section 2.

The left and right arms 11b, 11c of the reel brake member 11 are respectively inserted into the left and right operating member insertion grooves 27a, 27b of the lower section 3. Further, as FIGS. 12–14 show, the left and right arms 11b, 11c respectively lie along the insides of the left and right side walls of the cassette casing 1 and along the outsides of the support walls 12 of the lower section 3. The other elements such as the front lid 8 and the like are constructed similarly to those of the magnetic tape cassette as shown in FIGS. 3–11.

In the embodiment of FIGS. 12-15, it is possible to load the reel brake member 11 within the cassette casing 1 at its predetermined position in such a manner that the arms 11b, 11c of the reel brake member 11 are respectively located above the operating member insertion grooves 27a, 27b and the reel brake member 11 is superimposed upon the lower section 3. As a result, the magnetic tape cassette of the invention can automatically be assembled by an inexpensive machine the operation of which is relatively simple.

In use, when the front lid 8 is rotated upwards to expose the magnetic tape 6 at the front of the tape cassette, the operating tabs 11g, 11h of the reel brake member 11 are biased by the arms 8a, 8b and the reel brake member 11 is slid so as to break the engagement of the brake pins 11d, 11e and the brake wheels of the reel hubs 4a, 4b. In this case, if for any reason a force acting towards the inside of the cassette casing 1 is applied by the arms 8a, 8b to the operating members 11g, 11h, the flexible arms 11b, 11c of the reel brake member 11 are supported by the support walls 12, 12. As a result, the arms 11b, 11c are protected against being bent to the position shown in broken outline in FIG. 11. Accordingly, the reel brake member 11 can slidably be moved satisfactorily by the front lid 8 and the locking and unlocking of the reel hubs by the front lid 8 can be carried out satisfactorily.

As indicated above, in this embodiment of the invention, the operating member insertion grooves 27a, 27b are formed near the left and right support walls 12, 12 of the cassette casing 1, and the arms 11b, 11c and operating tabs 11g, 11h of the reel brake member 11 are respectively located along the outsides of the left and right support walls 12, 12 of the cassette casing 1, the arms 11b, 11c respectively extending through the operating member insertion grooves 27a, 27b. As a result, the locking and unlocking of the reel hubs 4a, 4b can be carried out satisfactorily by the front lid 8 and the assembling of the magnetic tape cassette is relatively simple and easy.

It will be apparent from the preceding description of the preferred embodiments of the invention that many modifications and variations can be effected by one skilled in the art without departing from the spirit or scope of the invention. For example, while in the disclosed embodiments the spring 25 biases the brake member 12 to the braking position and the lid 8 in moving from the closed position to the open position overcomes the force of the spring 25 in order to release the brake, it is also possible for a spring to bias the brake member 12 to the releasing position and for the lid 8 in moving from the open position to the closed position to overcome the force of such a spring in order to apply the brake. Accordingly, the scope of the invention should be determined by the appended claims only.

What is claimed is:

1. A magnetic tape cassette comprising:
   a hollow casing formed with an access opening therein;
   tape transport means including a pair of reel hubs rotatably mounted within said casing in spaced-apart relation to each other for supporting a magnetic tape wound thereon, said tape transport means defining a tape run adjacent to said opening:
   lid means;
   mounting means mounting said lid means movably on said casing between a closed position wherein said lid means covers said opening, thereby affording protection to said tape, and an open position wherein said lid means uncovers said opening, thereby exposing said tape for cooperation with recording-reproducing apparatus: and
   unitary brake means elongated in a direction parallel to said tape run and mounted within said casing movably between a braking position wherein said brake means locks said hubs against rotation and a releasing position wherein said brake means releases said hubs for rotation;
   said lid means being engageable with said brake means and in moving from said closed position to said open position effecting linear movement of said brake means from said braking position to said releasing position and in moving from said open position to said closed position effecting linear movement of said brake means from said releasing position to said braking position.

2. A magnetic tape cassette according to claim 1; wherein:
said mounting means comprises pivot means whereby said lid means pivots between said closed and open positions.

3. A magnetic tape cassette according to claim 1; wherein:
said lid means is formed adjacent to opposite ends thereof with first and second actuating means, respectively;
said brake means is formed adjacent to said first and second actuating means with first and second tab means, respectively; and
said engaging of said brake means by said lid means includes engaging of said first and second tab means by said first and second actuating means, respectively.

4. A magnetic tape cassette according to claim 1; wherein:
said lid means is formed adjacent to opposite ends thereof with first and second arms, respectively, said arms lying in spaced-apart planes respectively perpendicular to said tape run;
said mounting means comprises first and second pivot means connected to said casing and respectively connected to said arms, whereby said lid means pivots between said closed and open positions;
said brake means is formed adjacent to said first and second arms with first and second tab means, respectively; and
said engaging of said brake means by said lid means included engaging of said first and second tab means and said first and second arms, respectively.

5. A magnetic tape cassette according to claim 4; wherein:
said casing is formed with a pair of support walls respectively extending between said brake means and said arms, each of said support walls being formed with an aperture therein and each of said tab means extending through a respective one of said apertures for engagement with a respective one of said arms.

6. A magnetic tape cassette according to claim 4; wherein:
said casing is formed with a pair of support walls respectively adjacent and in supporting relation to said tab means, each of said tab means lying on the outside of a respective one of said support walls and when engaged by a respective one of said arms lying between said one of said arms and said one of said support walls.

* * * * *